United States Patent [19]

George et al.

[11] Patent Number: 5,806,027
[45] Date of Patent: Sep. 8, 1998

[54] VARIABLE FRAMERATE PARAMETER ENCODING

[75] Inventors: E. Bryan George, Plano; Alan V. McCree, Dallas; Vishu R. Viswanathan, Plano, all of Tex.

[73] Assignee: Texas Instruments Incorporated, Dallas, Tex.

[21] Appl. No.: 724,268

[22] Filed: Sep. 19, 1996

[51] Int. Cl.[6] .................................................. G10L 9/00
[52] U.S. Cl. ................................................................ 704/230
[58] Field of Search ..................................... 704/230, 220

[56] References Cited

U.S. PATENT DOCUMENTS 5,255,339  10/1993  Fette et al. ................................. 395/2

OTHER PUBLICATIONS

Spanias, Andrew S., "Speech Coding: A Tutorial Review", Proceedings of the IEEE, vol. 82, No. 10, Oct. 1994, pp. 1541–1582.
Gray, Robert M., "Vector Quantization", IEEE ASSP Magazine, Apr. 1984, pp. 4–29.
E. Bryan George, "Variable Frame Rate Parameter Encoding Via Adaptive Frame Selection Using Dynamic Programming", ICASP 1996.

McCree, et al., "A Mixed Excitation LPC Vocoder Model for Low Bit Rate Speech Coding," IEEE 1995 (1063–6676/95).

*Primary Examiner*—David R. Hudspeth
*Assistant Examiner*—Susan Wieland
*Attorney, Agent, or Firm*—Robert L. Troike; Wade James Brady III; Richard L. Donaldson

[57] ABSTRACT

A novel approach to parameter encoding is presented which improves coding efficiency and performance by exploiting the variable rate nature of certain classes of signals. This is achieved using an interpolative variable frame-rate breakpointing scheme referred to as adaptive frame selection (AFS). In the approach described in this report, frame selection is achieved using a recursive dynamic programming algorithm; the resulting parameter encoding system is referred to as adaptive frame selection using dynamic programming (AFS/DP). The AFS/DP algorithm determines optimal breakpoint locations in the context of parameter encoding using an arbitrary objective performance measure, and operates in a fixed bit-rate, fixed-delay context with low computational requirements. When applied to the problem of low bit-rate coding of speech spectral and gain parameters, the AFS/DP algorithm is capable of improving the perceptual quality of coded speech and robustness to quantization errors over fixed frame-rate approaches.

2 Claims, 4 Drawing Sheets

VARIABLE FRAMERATE PARAMETER ENCODING

The United States is licensed under the subject invention based on work done under contract number MDA904-94-C-60101.

TECHNICAL FIELD OF THE INVENTION

This invention relates to a method and system for performing variable frame rate (VFR) parameter encoding for low bit-rate speech coding systems.

BACKGROUND OF THE INVENTION

It is highly desirable to provide natural-sounding telephone bandwidth voice signals at bit rates of about 2.4 K bits per second. The conventional manner of transmitting acoustic voice by digital signal is at a bit rate of 64 K bits per second. Speech coding at low bit rates is desirable for telephone communication systems, including voice encryption (voice coder or vocoders), transmitting voice mail over telephone networks, and flexible management of voice and data over packet networks. The conventional method of digital encoding is pulse code modulation with a bandwidth of 4 kHz. A later form of waveform coding is known as Adaptive Deferential Pulse Code Modulation. This is at a bit rate of 32 Kilobits per second. New concepts based on source coding generates the digitized voice signal by analyzing how human speech is produced and how the ears perceive the synthesized version. A tutorial review of Speech Coding and vocoders is presented in Proceedings of the IEEE, Vol. 82, No. 10, October 1984 by Andreas S. Spanias pages 1541–1582, entitled, "Speech Coding: A Tutorial Review". Basically as shown in FIG. 1 a vocoder analyzes speech to generate a set of parameters that are used to drive a model that synthesizes a replica of the speech. The parameters are transmitted at very low bit rates. A typical Linear Predictive Coefficient (LPC) vocoder has the parameters of pitch, voicing, line spectrum frequencies (LSF) and speech gain (loudness of signal). LSFs correspond to the frequency response of the vocal tract at any given time. A more sophisticated model known as "Multi-Pulse Linear Predictive Coding" (MPLPC) is far more natural but operates at bit rates of 9.6 K bits per second. Another is the Mixed-Excitation Linear Prediction (MELP) speech coder. This is described in the PhD Thesis of A. V. McCree for Georgia Institute of Technology, August 1992 and is entitled, "A New LPC Vocoder Model for Low Bit Rate Speech Coding." This is also discussed in IEEE Transactions on Speech and Audio Processing, July 1995, Vol. 3, No. 4, pages 242–251 entitled, "A Mixed-Excitation LPC Vocoder Model for Low Bit Rate Speech Coding," by A. V. McCree and T. P. Barnwell III.

A significant source of speech quality degradation for low bit-rate speech coders such as MELP is an insufficiently high fame rate for model parameters representing the spectrum and gain of speech. The MELP codes, for instance, uses a frame size of 22.5 ms, corresponding to a rate of 44 frames/sec. At this rate, speech quality degradation is clearly identifiable by listeners as a "slurring" or "mushy" quality that is particularly acute during transitory speech events. In order to avoid these artifacts, it is necessary to resolve spectral and gain changes that occur as rapidly as 10 milliseconds (ms). Of course, attempting to decrease the same size from the present 22.5 ms to 10 ms would increase the bit rate required for gain and line spectrum frequency (LSF) quantization to unacceptable levels.

SUMMARY OF THE INVENTION

In accordance with one embodiment of the present invention a method for parameter encoding of speech includes organizing speech parameters into superframes and choosing M out of N frames as interpolations breakpoints where M<N. We use quantized parameters for interpolations.

These and other features of the invention that will be apparent to those skilled in the art from the following detailed description of the invention, taken together with the accompanying drawings.

DESCRIPTION OF THE DRAWINGS

FIG. 2b illustrates the corresponding LSF parameters for the frames in FIG. 1a;

FIG. 4 illustrates an example of trellis interpolation where

DESCRIPTION OF THE PREFERRED EMBODIMENT

Figure 2A:
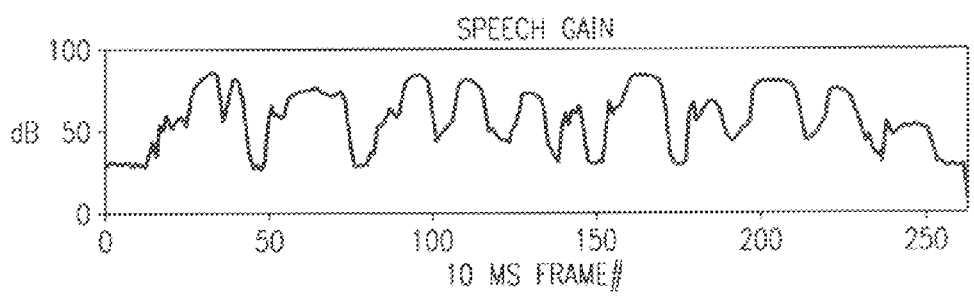
FIG. 2a illustrates speech gain over 10 ms frames.
Figure 2B:
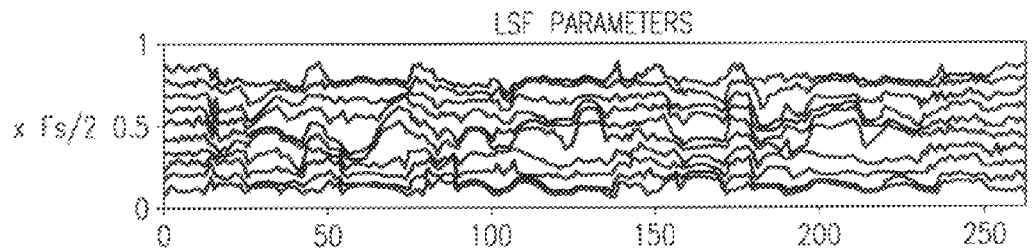
Figure 2C:
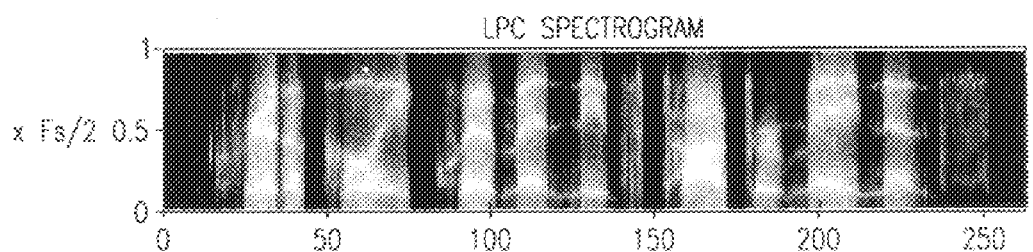
FIG. 2c illustrates the LPC Spectrogram corresponding to the frames in FIGS. 2a and 2b.

To deal with the problem of speech quality degradation for low bit rate speech coders at frame size of, for example, 22.5 ms, applicants disclose herein that it is possible to exploit the nature of conversational speech spectra and gain. FIG. 2a is an example of speech gain, FIG. 2b is the corresponding LSF parameters, and FIG. 2c the corresponding spectra for a typical utterance. There are 10 LSF frequency parameters in this example. The horizontal axis lists the 10 millisecond frames by frame number. Frame No. 50 would be a half a second after the start. The spectrogram of FIG. 2c is a combination of FIGS. 2a and 2b of the time varying spectral content of the speech. Spectral energy is reflected by brightness in the figure. The line spectrum frequencies are an equivalent representation of a time varying filter which is an electronic facsimile of the human vocal tract. Speech coders are guided by a speech synthesis model and the most commonly used model is the time varying all pole linear filter. This model is excited by a spectrally flat digital signal to generate synthetic speech sounds. As seen in FIG. 2, the evolution of these parameters is characterized by stable "nucleus" regions separated by rapid changes. The LSF changes can occur very rapidly and so the number of samples to get an accurate reading can be large. In order to reduce the number of samples and bits needed to represent the LSF parameter, some scheme must be provided. A parsimonious representation of these events may be achieved by varying the local sampling rate based on the rate of parameter change at a given instant. To achieve the variable rate structure a variable frame rate (VFR) coding strategy is employed whereby parameters are computed at a "base rate" (such as 100 frames per second) are updated at breakpoints where significant changes occur, and interpolated between these breakpoints. The VFR coding strategy thus provides time resolution corresponding to the base rate, while maintaining a lower average frame transmission rate.

The VFR approach, as described in the prior art, is a free-running algorithm requiring unacceptable buffering delays to achieve fixed-rate operation. An alternative fixed-rate strategy relatively low delay is the block VFR as described in the paper by V. Viswanathan, et al. entitled *"Variable Frame-Rate Transmission: A Review of the Methodology and Application to Narrowband LPC Speech Coding"* in IEEE Transactions on Communications COM-30(4: 674–686), April 1982 and in the paper by R. Schwartz, et al. entitled *"A Comparison of Methods for 300 to 400 VPS Vocoders,"* proceedings of ICASSP-83, pages 69–72, April 1983. In this block VFR approach, parameters computed at a base rate are organized into N-frame "blocks" or "superframes" and analyzed in isolation to determine M appropriate breakpoints, yielding an average frame rate of RN/M ms, assuming a base frame size of R ms. The parameter set is then reconstructed by linear interpolation between breakpoints. For example, assume that the number of 10 ms frames in a block are N=10 frames and M=4 are sent yielding an effective frame-size is 25 ms. The process is as follows: treat each superframe in isolation, and know that the last breakpoint sent in the previous superframe was the last frame of that block (commonly referred to as an "anchor frame") and know that the last frame in the current block is a breakpoint (anchor frame) I need only pick three (M-1) of the other 9 (N-1) frames. If you are going to treat these frames in isolation you need an anchor because part of the answer depends upon what you choose for the breakpoint in the next superframe. You don't know that yet. Delay is thus minimized by transmitting the known anchor frame (typically a boundary frame) such that interpolation of each superframe is independent of adjacent superframes; block VFR has an end to end transmission delay of 0(2N) frames.

Block VFR has been successfully implemented in a number of low and very low bit rate speech coders. This is discussed in M. Biedefeld's and G. Sandy's report entitled *"U.S. Report on the Performance of Low-Bit rate Voice Processors for NATO,"* Mitre Corp. Tech Rep. MTR 93W0000114, February 1994. Block VFR has notable drawbacks. In order to optimize speech coder quality, the M breakpoints of each superframe should be chosen to optimize a perceptually-based performance measure; however, the anchor frame is chosen to reduce delay rather than improve performance. As a result, longer superframes are required to approach the performance of free-running VFR.

Figure 1:
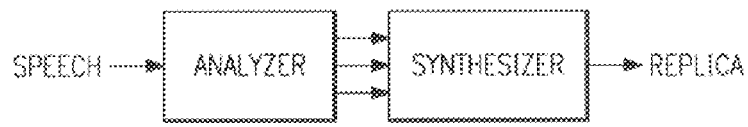
FIG. 1 is a block diagram illustrating a vocoder.
Figure 1A:
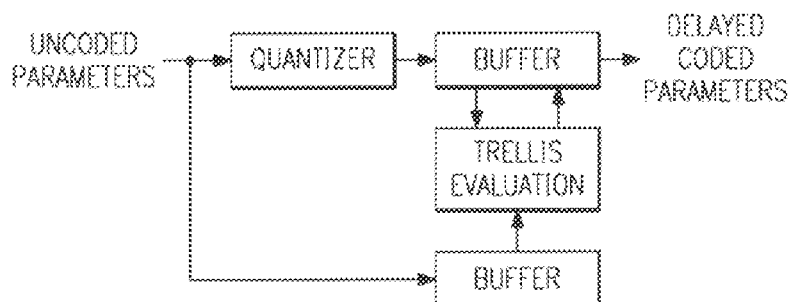
FIG. 1a is a block diagram of a portion of the analyzer according to the present invention.

In accordance with the present invention, we provide a novel approach to VFR parameter coding. A block diagram is shown in FIG. 1a. As in block VFR, we maintain the fixed-rate structure imposed by organizing parameters into superframes and choosing M out of N frames as interpolation breakpoints. We use quantized, rather than unquantized, parameters for interpolation to optimize the performance of the overall coding system. Every 10 ms set of parameters is quantized using for example Sector quantization. By quantization we refer to the process of mapping a continuous range of signal values to a finite range of values represented by digital information. In vector quantization, a vector quantizer maps a sequence of continuous or discrete vectors into a digital sequence. The mapping for each vector may or may not have memory in the sense of depending on part actions of the coder. A survey of vector quantization design techniques is described by Robert M Gray in a paper titled, "Vector Quantization" in IEEE ASSP Magazine of April 1984, pp 4–29. This article is incorporated herein by reference. We refer to this coding process as adaptive frame selection (AFS).

In contrast to block VFR, we remove the anchor frame constraint from AFS in favor of a more general selection framework. As discussed above, the anchor frame provides little benefit in terms of performance. Although its removal implies higher delay, this increased delay may be off-set by the ability to use shorter superframes. In addition, removing the anchor frame allows us to use delayed decision techniques to determine appropriate breakpoints, further boosting performance for shorter superframes.

In order to discuss how AFS is implemented, it is first necessary to describe a performance measure that will hopefully correlate well with perceptual performance. For reasons that will become clear, we have chosen to use a cumulative error measure $E_k$ defined at frame k (at the base frame rate) by $$E_k = \frac{\sum_{l=-\infty}^{k} W_l d(x_l, \hat{x}_l)}{\sum_{l=-\infty}^{k} W_l}$$

In this expression, $E_k$ is seen to be a weighted average of distances $\{d(x_1, \hat{x}_1)\}$ between unquantized vectors $\{x_1\}$ and candidate coded vectors $\{\hat{x}_1\}$ produced by interpolation of selected quantized vectors, where the "frame weights" $\{W_1\}$ are positive numbers directly corresponding to the importance of each distance.

Of course, the particular choice of weights and distance measure vary according to the type of data being represented. Generally, we proceed on the assumption that parameters in frames with large speech gains should be coded more accurately than those in low-energy frames. In coding speech gain, we may typically choose to quantize logarithmic speech gain using a simple Euclidean distance and $W_1=1$ for all 1 to yield a consistent percentage error in speech gain over a given utterance. For coding LSF's, we may define $d(x_1, \hat{x}_1)$ as Paliwal and Atal's weighted MSE as described in *Efficient Vector Quantization of LPC Parameters*, IEEE Trans. Speech and Audio Processing, vol. 1, pp. 3–14, Jan. 1993., and use the speech gain raised to a power of 0.6 for frame weighing. This weighting corresponds to the power law of hearing relationship between speech gain and perceived loudness. For a discussion on this see text of J. Durrant and J. Lovrinic, *Bases of Hearing Science*, pp. 149–150, William and Wilkins, Baltimore Md., 1977.

Figure 3:
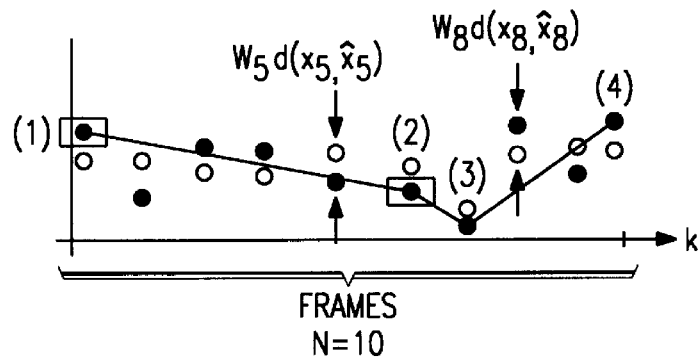
FIG. 3 illustrates a LSF parameter over K frames with two breakpoints per four frames of a superframe.

Given that the structure of candidate breakpoints repeats every N frames, we recognize the resulting search space as a trellis. As illustrated by the LSF diagram of FIG. 3, the distance metric is $d(x_1, \hat{x}_1)$, where x is the original data. In FIG. 3 the open circles represent the original data x and the quantized data (filed in circles) and the line represents the interpolation ($\hat{x}$ represents a point along the line at the desired frame location) between quantized breakpoints. K is the frame number. The sum is from $-\infty$ (minus infinity) to the current frame. The distances are weighted by a factor as discussed above, where the weight corresponds to the power low of hearing relationship between speech gain and perceived loudness. Our total cumulative error is based on the past and a trellis is set up.

Figure 4A:
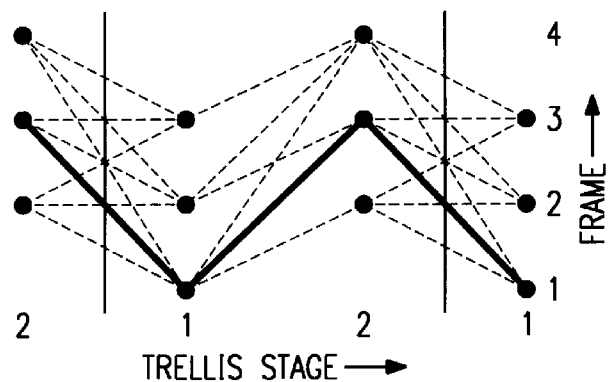
FIG. 4a is a trellis diagram and a particular path therethrough.
Figure 4B:
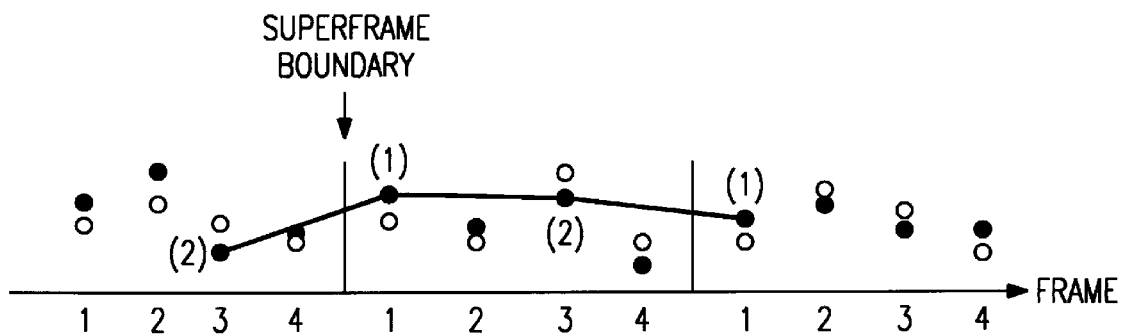
FIG. 4b shows the effect of this path or parameter coding for a one-dimension example.

The process of evaluating breakpoints $\{b_i\}$ in each superframe is aided by knowledge of practical constraints. In a given superframe, fixed-rate operation requires that each superframe contain exactly M breakpoints. Furthermore, we may assume (without loss of generality) that breakpoints within a superframe are casual; that is, breakpoints are assumed unique and monotonically increasing. These assumptions imply respective numerical constraints on breakpoints in each superframe:

Breakpoint $b_i$ may not exist outside the range [i,N−M+i]. $1 \leq b_1 < b_2 > \ldots < b_M \leq N$ The trellis shows all possible interpolation paths within a given superframe. We have, for example in FIG. 4, four frames in each superframe (N=4) and we are going to have two breakpoints (M) within the superframe. Since the frame sizes are each 10 ms that makes the effective frame size for transmission 20 ms. The first frame selected becomes the first breakpoint. One cannot choose the same frame for both breakpoints within a superframe. If you choose the second frame as the breakpoint you have to use the third or fourth frame as the second breakpoint. There are no such constraints between superframes. FIG. 4 shows an sample of trellis interpolation for the case of N=4, M=2. In FIG. 4a the four frames for each superframe are denoted along the vertical axis, and in FIG. 4b they are denoted along the horizontal axis. FIG. 4(a) is a trellis diagram showing eligible candidates for breakpoints 1 and 2 in a given superframe (along the horizontal trellis stage axis) as trellis nodes along the vertical frame axis, which ranges from 1 to 4 for each superframe. Available nodes in the trellis reflect the fixed-rate constraint. The lines connecting nodes in each stage to nodes in adjacent stages show possible valid paths through the trellis, and are determined by both fixed-rate and causality constraints. The trellis shows all possible paths to help one evaluate which path should be used, depending on the past and the future. You have to determine a set of paths that terminate at the nodes of each trellis stage.

Finally, we note that the use of the previously discussed cumulative error measure implies that dynamic programming concepts may be employed to reduce complexity over exhaustive path searching, specifically by using the well-known Viterbi algorithm to determine best interpolation paths up to each node in each stage of the trellis. For the example in FIG. 4, assume that three survivor paths at the second trellis stage in the previous superframe terminate at the second, third, and fourth frames of that superframe. The three possible candidates for the first breakpoint in the current superframe are the first, second, or third frames of the current superframe. The possible paths are from frames 2, 3, or 4 in the past superframe to frames 1, 2, or 3 in the current superframe. To determine optimal paths terminating on these nodes, we must evaluate each possible path terminating on each node, and choose as optimal that path with the lowest cumulative error metric. The one that is the lowest is the survivor path in that node for that stage. To proceed to the second stage of the trellis, we then go from first hypothesized breakpoint which can be frame 1, 2, or 3 to a hypothesized breakpoint which can be frame 2, 3, or 4 and you have the candidate paths shown. All of the paths undergo interpolation and evaluation to determine which of the paths terminating on each node has the lowest cumulative error metric and these are the next survivor paths for the next trellis stage (stage 1) in the next superframe. This is a recursive process. The breakpoint path with the lowest cumulative error metric is the best choice. We update survivor paths for these breakpoints. What happens in the next frame has an effect as to which is chosen.

Figure 5:
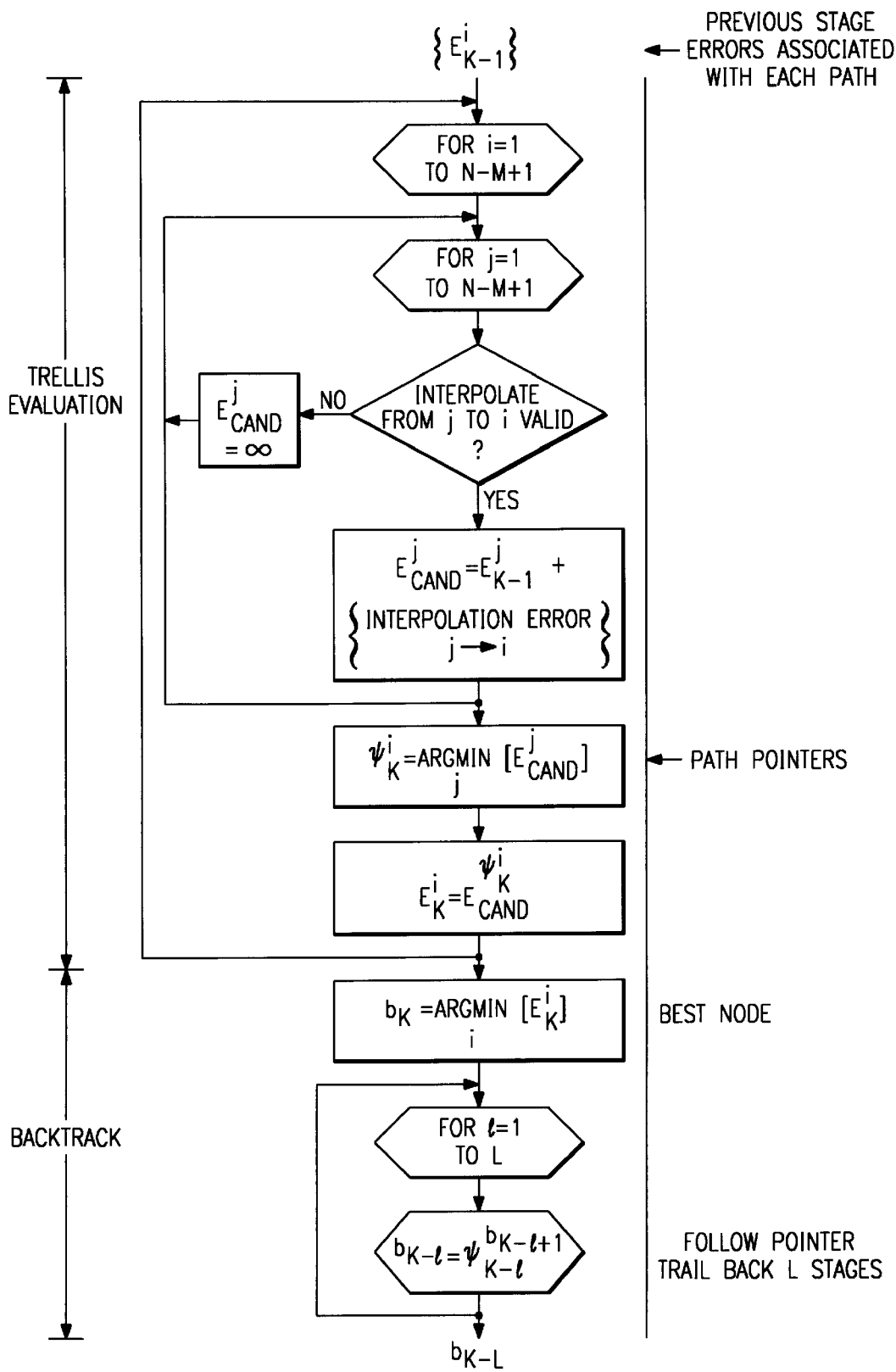
FIG. 5 is a flow chart for trellis evaluation and backtracking.

Between superframe the path can go anywhere to anywhere else. We evaluate which is the optimal path. Some paths go away because they are not optimal. When we get to the end of a superframe, we can make a guess as to the first breakpoint because they are stabilized. We backtrack a fixed number stages such as back three stages and follow the optimal path back that number of stages to make a finial decision. Follow best path back to find the breakpoint. Paths not converging are discarded. Perform backtracks to determine breakpoints of first superframe. A flow chart of the trellis evaluation and backtracking is shown in FIG. 5.

The solid lines shown through the trellis in FIG. 4(a) demonstrates a particular path through the trellis, and FIG. 4(b) shows the effect of this path on parameter coding for a one-dimensional example. The empty circles in this example are the original parameters $\{x_k\}$, while the solid circles represent quantized parameters $\{\hat{x}_k\}$ used for interpolation. In each superframe, we denote the frame chosen as the m-th interpolation breakpoint as (m).

FIG. 4(b) illustrates two very important features of the AFS/DP algorithm: First, we see that without the presence of an anchor frame, the results of trellis interpolation in a given superframe rely in general on the choice of breakpoints in the next superframe, implying the need for delayed decision techniques. Second, we see that trellis interpolation can compensate for quantization errors at each frame. This is due to the fact that the AFS/DP algorithm optimizes its cumulative error measure by evaluating quantized candidate vectors computed at high base rate, implying that AFS/DP takes advantage of the diversity of quantized candidates. As a result, parameter coding using the AFS/DP algorithm can avoid the effects of single badly quantized frames, thus reducing undesirable spectral/gain fluctuations. This effect is particularly pronounced when delayed decision is incorporated.

Figure 6A:
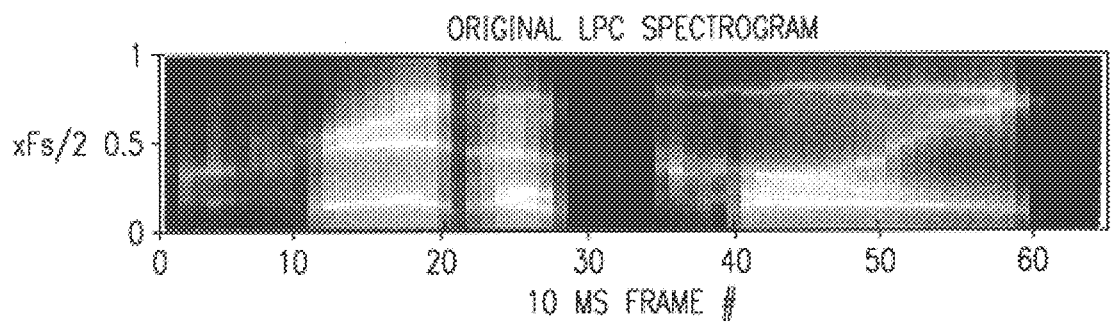
FIG. 6a illustrates the original LPC spectrogram of an example.
Figure 6B:
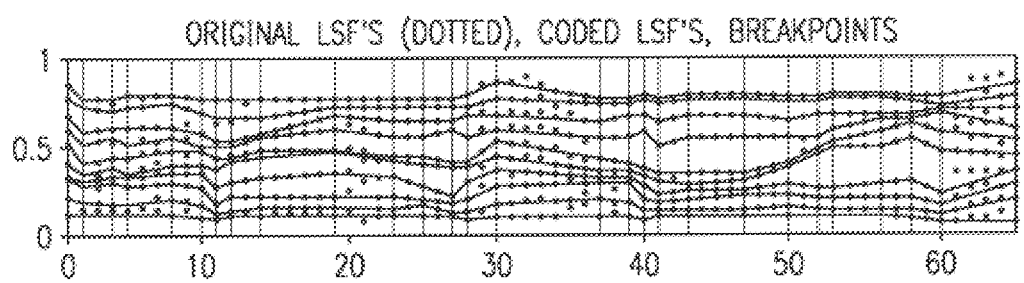
FIG. 6b illustrates the LSF parameters before and after the coding according to the present invention with the original LSF is dotted, the coded LSF's (not dotted) and with the vertical lines showing the location of the breakpoints.
Figure 6C:
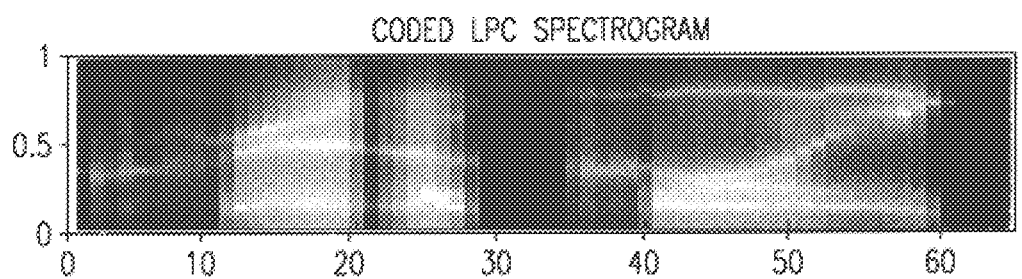
FIG. 6c illustrates the coded LPC Spectrogram for the example in FIGS. 5a and 5b.

FIG. 6 shows an example of the AFS/DP algorithm applied to coding LSF parameters computed at a base rate of 100 frames/second and quantized using a 34-bit scaler quantizer. In this example, the AFS/DP algorithm is applied using a superframe size N=20 frames, chosen M=8 breakpoints in each superframe, resulting in an average transmission rate of 40 frames/s. FIG. 6a is the original LPC spectrogram. FIG. 6b illustrates the LSF parameters before (dotted) and after AFS/DP coding (lines), with vertical lines showing the location of breakpoints chosen by the algorithm. FIG. 6c is the LPC spectrogram resulting from the coded parameter set.

As expected, the AFS/DP algorithm chooses breakpoints densely in high-energy portions of the utterance that exhibit rapid spectral change, and less densely in both low-energy and spectrally stable regions. It is also worth noting that in the presence of quantization, the AS/DP algorithm does not always choose breakpoints where visual inspection would suggest; this is due to the algorithm's tendency to optimize the cumulative error measure, and reflects the effect of badly quantized frames on the algorithm.

Examination of the trellis shown in FIG. 4(a) shows that the trellis has an infinite constraint length, that is, trellis paths are never guaranteed to converge by "backtracking" thorough the trellis. As a result, it is necessary to set a "decision delay" parameter L corresponding to the number of trellis stages to wait before making a final decision on the current trellis stage. Of course, in order to minimize delay, it is necessary to use the smallest value of L possible that achieves acceptable performance.

Our experiments indicate that a decision delay of L≧M is sufficient; this is as expected, since the effect of interpolation path choice in the next superframe has the greatest effect on the current superframe's path, while the effects of subsequent superframes are negligible. We have analyzed the end-to end transmission delay of the AFS/DP algorithm assuming synchronous bitstream transmission. The analysis is similar to that for block VFR, with the addition of delay to account for the decision delay L; for a value of L=M, the transmission delay of AFS/DP is O(3N), although delay drops to O(2N) as M→N. We have also noted that by pruning candidate frames from the trellis, we may reduce delay further. Our analysis indicates that pruning frames from the first and last stages has the greatest impact on delay, reducing it by the number of frames pruned.

We have completed initial trade studies of using the AFS/DP algorithm to code LSP and gain parameters. Using a base rate of 100 frame/s, we have attempted to find suitable values of N, M, and L to achieve various combinations of average frame rate, perceptual quality compared to the unquantized 10 ms MELP system, and transmission delay. In these early experiments, we quantized log gain using 5 bits/sample, and quantized LSF's using 34-bit scaler quantization. We have found that in all cases, L=M provides reasonable performance.

For delays of 150 ms or less, an average frame size of 25 ms (N=5, M=2) was found to be sufficient to represent LSF parameters. We found in this case that perceptual performance was comparable to block VFR with N=10, M=4, and with less end-to-end transmission delay (140 ms compared to 160 ms). We observed that an average frame size of 16.7 ms (N=5, M=3) was necessary to represent speech gain while avoiding slurring effects.

The adaptive frame selection described above is part of the analyzer in FIG. 1 where the operation is performed for example by a digital signal processor such as Texas Instruments, Incorporated DSP TMS320330 with storage for storing the signal values for the frames and processor for performing the interpolation, vector quantization and path selections and decisions discussed above. The steps discussed above may, for example, be steps in a software program.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. An encoder for encoding vocoder parameters comprising:
   a quantizer responsive to uncoded vocoder parameters of each frame to produce a quantized set of parameters for each frame;
   a buffer responsive to said uncoded vocoder parameters for storing said uncoded vocoder parameters that are not quantized;
   a buffer/interpolator coupled to said quantizer;
   a trellis evaluator coupled to said buffer and said buffer/interpolator and responsive to said uncoded vocoder parameters that are not quantized and said uncoded vocoder parameters that are quantized for dynamically evaluating a set of hypotheses over time with perceptually weighted distance metric to produce a set of interpolation breakpoints; and
   said buffer/interpolator coupled to said evaluator for buffering said uncoded vocoder parameters without quantization and buffering and interpolating said uncoded vocoder parameters with quantization to produce a bit stream corresponding to delayed interpolated vocoder parameters with quantization.

2. An encoder for encoding spectral parameters comprising:
   a quantizer responsive to uncoded spectral parameters of each frame to produce a quantized set of parameters for each frame;
   a buffer responsive to said uncoded spectral parameters for storing said uncoded spectral parameters that are not quantized;
   a buffer/interpolator coupled to said quantizer;
   a trellis evaluator coupled to said buffer and said buffer/interpolator and responsive to said uncoded spectral parameters that are not quantized and said uncoded spectral parameters that are quantized for dynamically evaluating a set of hypotheses over time with perceptually weighted distance metric to produce a set of interpolation breakpoints; and
   said buffer/interpolator coupled to said evaluator for buffering said uncoded spectral parameters without quantization and buffering and interpolating said uncoded spectral parameters with quantization to produce a bit stream corresponding to delayed interpolated spectral parameters with quantization.

* * * * *